(12) United States Patent
Faerber

(10) Patent No.: US 8,371,644 B2
(45) Date of Patent: Feb. 12, 2013

(54) COVER ELEMENT CARRIER HAVING CONTROL SLIDE

(75) Inventor: Manfred Faerber, Wielenbach (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 13/148,632

(22) PCT Filed: Jan. 21, 2010

(86) PCT No.: PCT/DE2010/000063
§ 371 (c)(1),
(2), (4) Date: Sep. 7, 2011

(87) PCT Pub. No.: WO2010/102598
PCT Pub. Date: Sep. 16, 2010

(65) Prior Publication Data
US 2012/0025568 A1    Feb. 2, 2012

(30) Foreign Application Priority Data
Mar. 13, 2009    (DE) .......................... 10 2009 013 105

(51) Int. Cl.
*B60J 7/05*    (2006.01)
*B60J 7/053*    (2006.01)
(52) U.S. Cl. .......................... 296/222; 296/221; 296/224
(58) Field of Classification Search .................. 296/221, 296/222, 224
See application file for complete search history.

(56) References Cited

U.S. PATENT DOCUMENTS

| 4,647,104 | A | 3/1987 | Kohlpaintner et al. |
| 6,390,545 | B1 | 5/2002 | Makino et al. |
| 6,568,750 | B2 | 5/2003 | Radmanic et al. |
| 7,810,879 | B2 * | 10/2010 | Nakamura ..................... 296/221 |

FOREIGN PATENT DOCUMENTS

| DE | 3417098 A1 | 11/1985 |
| DE | 3442600 A1 | 5/1986 |
| DE | 10033887 C1 | 8/2001 |
| DE | 10057012 A1 | 9/2001 |
| DE | 102006060369 A1 | 6/2008 |

OTHER PUBLICATIONS

International Search Report for PCT/DE2010/000063 dated May 28, 2010.

* cited by examiner

*Primary Examiner* — Dennis Pedder
(74) *Attorney, Agent, or Firm* — Marshall, Gerstein & Borun LLP

(57) ABSTRACT

A vehicle roof having at least one cover element, which selectively closes or at least partially exposes a roof opening and which can be adjusted between a closed position and a lowered displacement position and, with respect to a vehicle longitudinal center plane, comprises a carrier element on either side, the carrier element comprising a guide path, which interacts with at least one guide element of a drive carriage for pivoting the cover element, the carriage being guided in a guide rail fixed to the roof. At least one rear-side control slide is disposed on the carrier element and guides the cover element in a guide channel of the respective guide rail during displacement of said element and secures the cover element against pivoting. When pivoting the cover element into the lowered displacement position, the rear-side control slide recedes into the respective guide channel of the respective guide rail while sliding over a ramp.

5 Claims, 13 Drawing Sheets

COVER ELEMENT CARRIER HAVING CONTROL SLIDE

BACKGROUND OF THE INVENTION

1. Field of the Invention

The invention relates to a vehicle roof with at least one cover element which optionally closes or at least partially opens up a roof opening.

2. Related Technology

A vehicle roof of this type is known from practice and comprises a cover element which has a carrier element, which constitutes a pivoting or deployment arm for the cover element, along both of the lateral edges of said cover element with respect to a longitudinal center plane of the vehicle. Guide rails are arranged along the lateral edges of the roof opening, which can be closed by means of the cover element, said guide rails being arranged in a manner fixed to the roof and one of the carrier elements being guided displaceably in each thereof when the cover element is actuated. Furthermore, a driving carriage is arranged in each of the guide rails, the driving carriage, for the pivoting of the cover element, interacting with a guide track which is arranged on the respectively assigned carrier element of the cover element. The profile of the guide track defines a pivoting movement of the cover element as the driving carriages are moved in the guide rails, specifically in such a manner that the cover element can be pivoted between a closed position, in which the roof opening is completely closed, a ventilation position, in which a rear edge of the cover element is deployed in relation to a rear, fixed roof section, and a lowered displacement position, in which the cover element can be moved in the longitudinal direction of the vehicle under the rear, fixed roof section in order to open up the roof opening. During the pivoting operation, the cover element is secured against movement in the longitudinal direction of the vehicle by means of "control slides". The control slides are arranged on the carrier elements of the cover element and interact with corresponding recesses on an upper boundary wall of the respective guide rail. When the cover element pivots into the lowered displacement position, the control slides enter a guide channel of the respective guide rail.

The problem with the above-described vehicle roof is that the cover element experiences a sudden offset when pivoting between the closed position and the lowered displacement position. The reason for this is that the carrier elements of the cover element each collide at the vehicle front end of the guide rails with a fixed stop which initiates a switch from the displacement movement into a pivoting movement such that the carrier elements of the cover element are moved upward by the steep rear profile of the carrier element guide tracks which interact with the driving carriages. The control slides, which are guided in the guide rails during the displacement, enter here into corresponding control recesses on the guide rails and thereby secure the cover element from moving in the longitudinal direction of the vehicle. During the lowering movement, the cover element drops rapidly downward along the steep rear profile of the carrier element guide tracks, which interact with the driving carriages, the control slides entering freely into the respective guide track of the relevant guide rail until they strike against a lower guide surface of same.

Furthermore, it is known from practice to control a sliding roof cover element with respect to the pivoting movement thereof by an additional control lever which interacts with a corresponding control element in the relevant guide rail. However, this solution is associated with a multiplicity of components and therefore also with high costs.

SUMMARY OF THE INVENTION

The invention provides a vehicle roof of the generic type mentioned at the beginning which is distinguished by a harmonious lowering movement of the cover element and a simultaneously low number of parts for the kinematics of a cover element.

Accordingly, the invention provides a vehicle roof with at least one cover element that optionally closes or at least partially opens up a roof opening, is displaceable between a closed position and a lowered displacement position and has a respective carrier element on both sides with respect to a longitudinal center plane of the vehicle, the carrier element comprising a guide track which, for the pivoting of the cover element, interacts with at least one guide element of a driving carriage that is guided in a guide rail that is fixed to the roof, wherein at least one rear control slide is arranged on the carrier element, said control slide securing the cover element during the pivoting thereof against moving in the longitudinal direction of the vehicle and, during movement of the cover element, being guided in a guide channel of the respective guide rail and securing the cover element against pivoting, wherein, during pivoting of the cover element into the lowered displacement position, the rear control slide enters the relevant guide channel of the relevant guide rail via a ramp.

The core of the invention consequently consists in providing damping in the form of a ramp for the rear control slide, the damping slowing down the entry and exit speed of the control slide into and out of the guide channel of the relevant guide rail in the vertical direction of the vehicle. A harmonious movement sequence when lowering the cover element into the displacement position thereof and when pivoting said cover element back into the closed position thereof can therefore be achieved with a low outlay on components. When the cover element is moved from the position thereof which opens up the roof opening into the closed position, the ramp serves as a stop for the cover element, with which stop the relevant control slide collides such that, by means of the interaction of the driving carriage and the guide track of the carrier element, the cover element can be pivoted upward out of the displacement position thereof into the closed position thereof. A further cover element stop possibly arranged in the front end region of the guide rails is therefore unnecessary. It is therefore also unnecessary to precisely coordinate a front stop and a control slide counterbearing which is formed on the guide rail and which, by interaction with the control slide, prevents displacement of the cover element during the pivoting movement thereof.

In an embodiment of the vehicle roof according to the invention that can be realized particularly cost-effectively, the ramps for the rear control slides are each formed by a notch in the respective guide rail. Additional components forming the ramps are therefore not required. As an alternative, the ramp may also be formed by an insert in the respective guide rail, which insert is formed, for example, as an injection molded plastic part.

A particularly harmonious movement sequence during the pivoting of the cover element can be achieved if the ramps each have a curved profile in the vertical direction of the vehicle.

In order to ensure precise entry of the rear control slides into an upper locking recess of the respective guide rail, the locking recess forming the counterbearing, a vehicle front edge of the ramps is in each case aligned at least approximately with a front edge of the upper locking recess of the respective guide rail.

An expedient embodiment of the vehicle roof according to the invention also comprises, in addition to the rear control slides, front control slides which are preferably likewise arranged on the carrier elements, each interact with a corresponding locking recess of the relevant guide rail and, during the movement of the cover element, are likewise each guided in a guide channel of the relevant guide rail. In order to be able to achieve the maximum possible movement distance of the cover element, an intermediate space, the dimensions of which in the vertical direction of the vehicle are larger than or equal to the dimensions of the front control slide in the vertical direction of the vehicle, is located between the vehicle front edge of the ramp and an upper wall of the respective guide rail. The front control slide can therefore be moved past the relevant ramp in the rear direction of the vehicle.

In order to ensure a harmonious transfer between the ramp and the locking recess for the rear control slide, in an expedient embodiment of the vehicle roof according to the invention, the rear control slide has an overall height which is greater than the intermediate space between the upper wall of the guide rail and the vehicle front edge of the ramp.

In particular, a ramp formed within the context of the invention for a rear control slide has proven advantageous if the rear end region of the guide track of the carrier element has a carry-along section which has a greater slope than that region of the relevant guide track which is arranged at the front of the end region.

BRIEF DESCRIPTION OF THE DRAWINGS

Further advantages and advantageous refinements of the subject matter of the invention can be gathered from the description, the drawing and the patent claims.

An exemplary embodiment of a vehicle roof according to the invention is illustrated schematically in simplified form in the description and is explained in greater detail in the drawing below. In the drawings.

DETAILED DESCRIPTION

Figure 1:
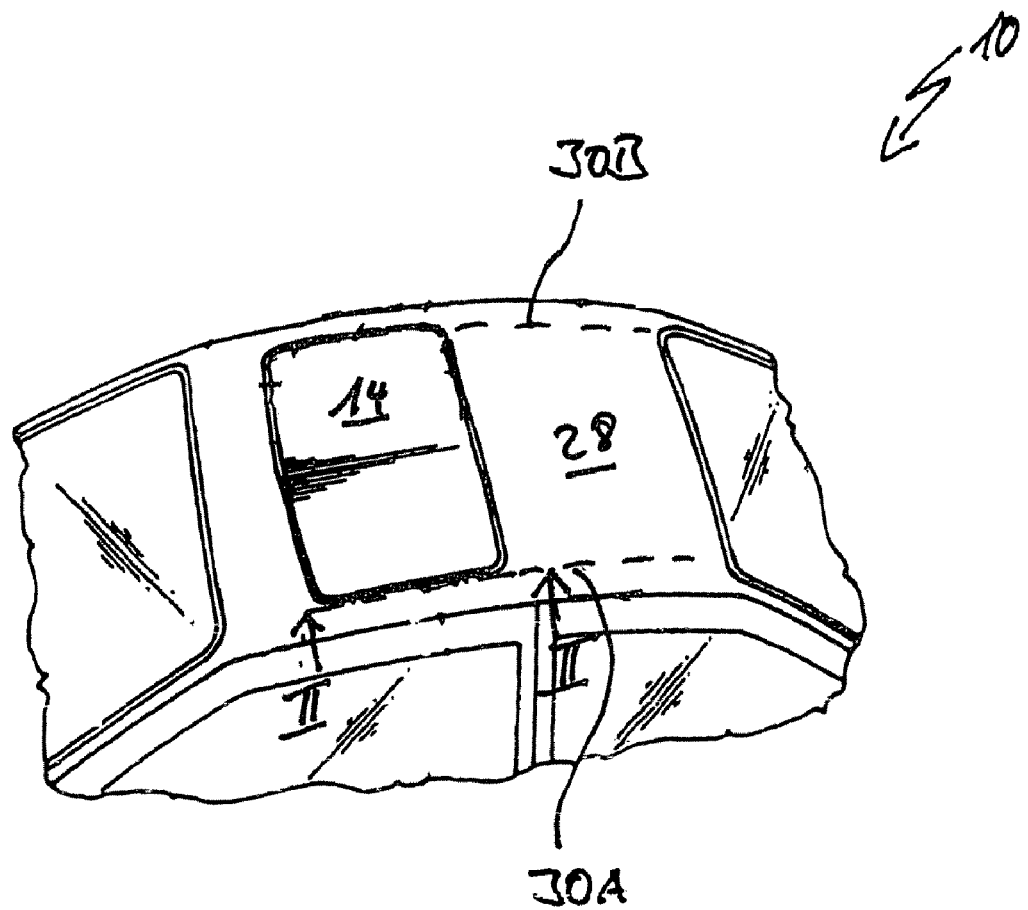
FIG. 1 shows a perspective top view of a vehicle roof according to the invention with a roof opening system.

The drawing illustrates a vehicle roof 10 of a passenger vehicle, which is provided with a roof opening 12 which can optionally be closed or at least partially opened up by means of a cover element 14. The cover element 14 is part of a roof opening system, which is illustrated in detail in FIGS. 2 to 13, and comprises a glass body 16 which is provided with a frame 18 which is formed from polyurethane foam and in which an inner cover panel is embedded. The inner cover panel has fastening tabs 20 which protrude downward at right angles in relation to the plane of the glass body 16 and serve to connect the cover element 14 to cover element carriers 22 which are arranged on lateral edges of the cover element 14 on both sides of a longitudinal center plane of the vehicle and are part of a displacement device for the cover element 14. The fastening tabs 20 are each screwed via a screw 24 to the respective cover element carrier 22.

Figure 2:
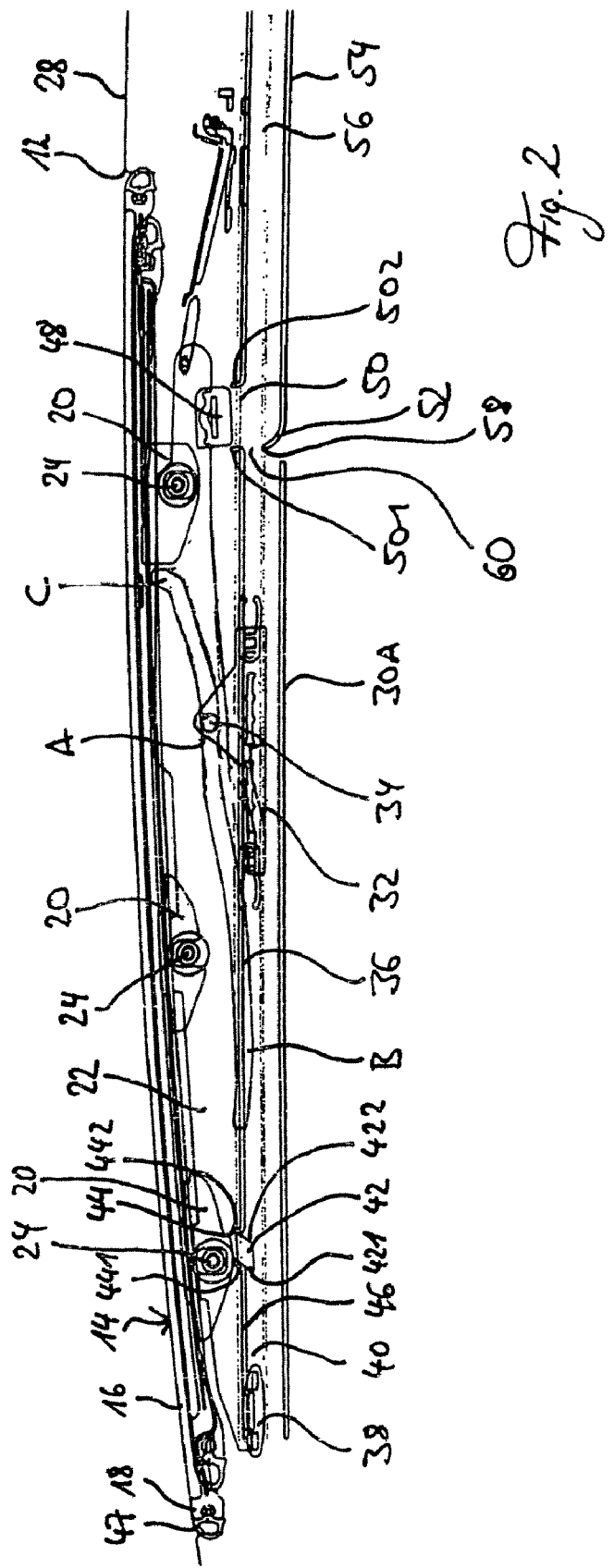
FIG. 2 shows a schematic longitudinal section through the roof opening system in the region of the driving mechanism thereof along the line II-II in FIG. 1 in the closed position of a cover element.
Figure 3:
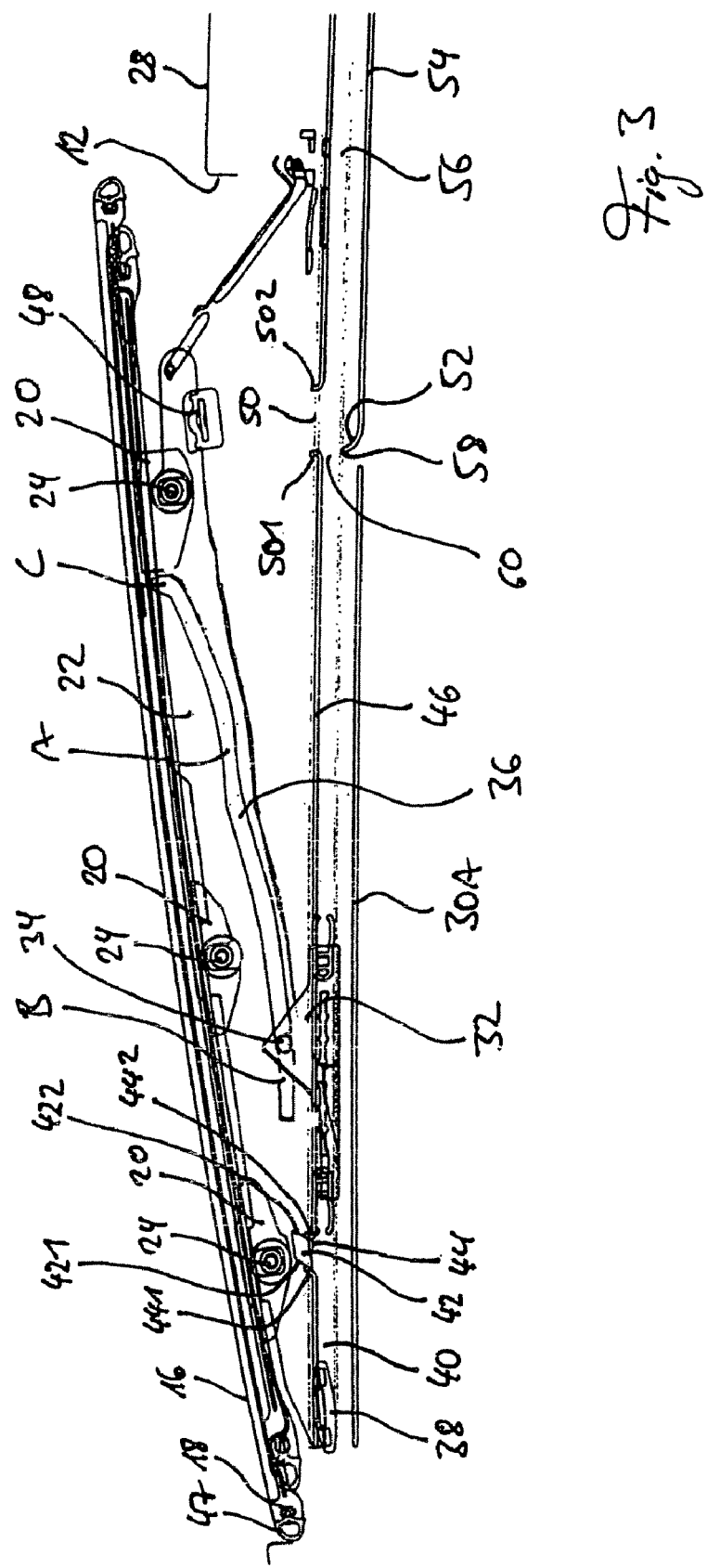
FIG. 3 shows a view corresponding to FIG. 2 but in the ventilation position of the cover element.
Figure 4:
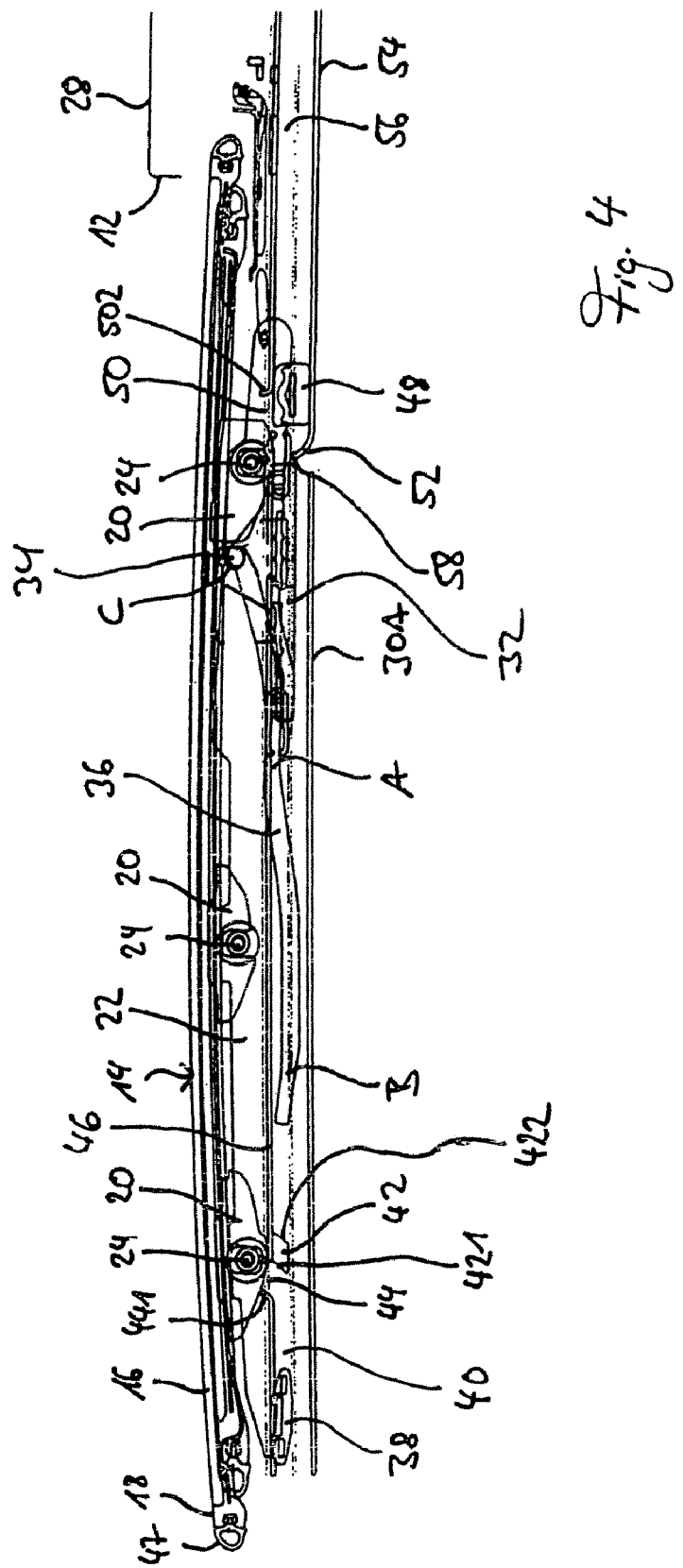
FIG. 4 shows a view corresponding to FIG. 2, but in a lowered displacement position of the cover element.

The displacement device for the cover element 14 serves to pivot the cover element 14 between a closed position, which is illustrated in FIG. 2 and in which the roof opening 12 is closed, a ventilation position, which is illustrated in FIG. 3 and in which a rear edge 26 of the cover element 14 is deployed upward in relation to a rear fixed roof section 28, and a lowered displacement position, which is illustrated in FIG. 4 and in which the cover element 14 can be moved along guide rails 30A and 30B, which extend along the lateral edges of the roof opening 12, and under the rear fixed roof section 28.

The description below ensues solely with reference to the displacement device region which is arranged on the left in the forward direction of travel and which is assigned to the guide rail 30A. The displacement device region which is arranged on the right in the forward direction of travel and is assigned to the guide rail 30B is formed in a manner corresponding thereto mirror-symmetrically with respect to the longitudinal center plane of the vehicle.

As can be gathered from the drawing, the displacement device comprises a driving carriage 32 which is guided displaceably in the longitudinal direction of the vehicle in the guide rail 30A and is driven by means of a pressure-resistant driving cable (not illustrated specifically here). The driving carriage 30 comprises a guide pin 34, which extends in the transverse direction of the vehicle and reaches through a guide track 36 which is designed as a slotted guide, is formed on the cover element carrier 22 and the profile of which in the longitudinal direction of the vehicle defines a pivoting operation of the cover element 14, which pivoting operation is triggered by the driving carriage 32 moving in the longitudinal direction of the vehicle. In particular, the guide track 36 of the cover element carrier 22 has a region A which is assigned to the closed position (illustrated in FIG. 2) of the cover element 14 and in which the guide pin 34 is located in said closed position. Furthermore, the guide track 36 has a front region B which is assigned to the ventilation position, illustrated in FIG. 3, and in which the guide pin 34 is arranged in said ventilation position. A rear guide track end region C is assigned to the lowered displacement position (illustrated in FIG. 4) of the cover element 14. In said lowered displacement position, the rear end region C serves as a carry-along section for the guide pin 34 of the driving carriage 32. Said carry-along section constitutes an upwardly pointing bend in the guide track 34 and consequently has a greater slope than those regions of the guide track 34 which are arranged at the front of the end region C.

A slide 38 which is guided in a guide channel 40 of the guide rail 30A and defines a pivot axis of the cover element 14 is arranged at the front end of the carrier element 22. Furthermore, a front control slide 42 is arranged on the cover element carrier 22 to the rear of the slide 38, said front control slide protruding in the transverse direction of the vehicle and, in a section in the longitudinal direction of the vehicle, having the basic shape of a parallelogram and securing the cover element 14 in the closed position illustrated in FIG. 2 and in the ventilation position illustrated in FIG. 3 against inadvertent displacement in the longitudinal direction of the vehicle. For this purpose, the front control slide 42 interacts via a front end surface 421 and a rear end surface 422 with a locking recess 44 on the upper wall 46 of the guide rail 30A. The locking recess 44 is bounded at the front by a guide wall 441 and at the rear by a guide wall 442. The guide walls 441 and 442 are each inclined in the direction of the vehicle rear such that, when the control slide 42 is moved in the locking recess 44, which is designed in the manner of a slotted guide, the cover element 16 experiences an offset in the longitudinal direction of the vehicle, specifically when the cover element 14 pivots from the closed position into the ventilation position in the direction of the vehicle rear, and therefore the front edge of the cover element 14 is spaced apart from the front edge of the roof opening 12, and a seal 47 which is arranged on the front edge of the cover element 14 cannot be squashed and damaged.

A rear control slide 48 is arranged in a rear region of the cover element carrier 22, said rear control slide likewise protruding in the transverse direction of the vehicle and interacting with a rear locking recess 50 which is likewise formed on the upper wall 46 of the guide rail 30A and is bounded by a front guide wall 501 and by a rear guide wall 502 which form inlet webs for the control slide 48 and guide the latter as it passes through the locking recess 50. A ramp 52 is formed below the front edge of the locking recess 50, the ramp constituting a notch in a lower boundary wall 54 of the guide rail 30A and via which, when the cover element 14 is pivoted into the lowered displacement position, the control slide 48 enters a guide channel 56 of the guide rail 30A in a sliding and damped manner. The ramp 52 has a curved profile in the vertical direction of the vehicle and a front edge 58 which is aligned at least approximately with the front guide wall 501 of the locking recess 50. Furthermore, the front edge 58 of the ramp 52 forms, with the upper wall 46 of the guide rail 30A, an intermediate space 60 which substantially corresponds to the dimensions of the front control slide 42 in the vertical direction of the vehicle such that said control slide can move past the ramp 52 when the cover element 16 is moved under the rear fixed roof section 28. The overall height of the control slide 48 is larger than the intermediate space 60, and therefore the control slide 48 can be harmoniously transferred from the ramp 52 into the locking recess 50 and vice versa.

In the embodiment described here, the guide track 36 is designed as a slotted guide mechanism of the cover element carrier 22. As an alternative, it is, however, also conceivable for a web guide to be formed on a cover element carrier, said web guide being engaged around by a claw section of a driving carriage and forming the guide track which interacts with the guide element of the driving carriage.

The roof opening system illustrated in the drawing operates in the manner described below.

Starting from the closed position of the cover element 14, which is illustrated in FIG. 2 and in which the guide pin 34 of the driving carriage 32 is arranged in the region A of the slotted guide mechanism 36, as the cover element 14 pivots into the ventilation position thereof, which is illustrated in FIG. 3, the driving carriage 32 is moved in the direction of the vehicle front into a region B of the slotted guide mechanism 36, which region drops in the direction of the vehicle front in relation to the region A, and therefore, by interaction of the guide pin 34 with the slotted guide mechanism 36, the rear edge 26 of the cover element 14 is deployed upward in relation to the fixed roof section 26. At the same time, the control slide 42 is moved upward in the locking recess 44 such that, by means of the inclination of the guide walls 441 and 442, the cover element 14 experiences a slight offset in the direction of the vehicle rear and, in order to protect the seal 47, a gap is formed between the front edge of the cover element 14 and the front edge of the roof opening 12.

If, in order to open up the roof opening 12, the cover element 14 is to be moved under the rear fixed roof section 28, the driving carriage 32, likewise starting from the closed position illustrated in FIG. 2, is moved in the direction of the vehicle rear into the region C of the slotted guide mechanism 36. As a result, the cover element 14 is pivoted about the pivot axis, which is defined by the slide 38, into the lowered displacement position such that the control slide 48 enters through the locking recess 50 into the guide channel 56 of the guide rail 30A. In this case, the control slide 48 moves onto the ramp or run-on ramp 52, which is integrated in the guide rail 30A, and therefore, even when the guide pin 34 enters the steeply positioned region C of the slotted guide 36, the cover element carrier 22 does not drop freely into the guide channel 56 but rather experiences damping by the control slide 48 sliding on the curved ramp 52. The pivoting operation into the lowered displacement position therefore develops harmoniously. The front control slide 42 is also then arranged in the guide channel 56 of the guide rail 30A. The cover element 14 can now be moved to the rear and under the rear fixed roof section 28 by the driving carriage 32 moving in the direction of the vehicle rear, the smaller overall height of the front control slide 42 enabling it to move past the ramp 42 above the latter.

Figure 5:
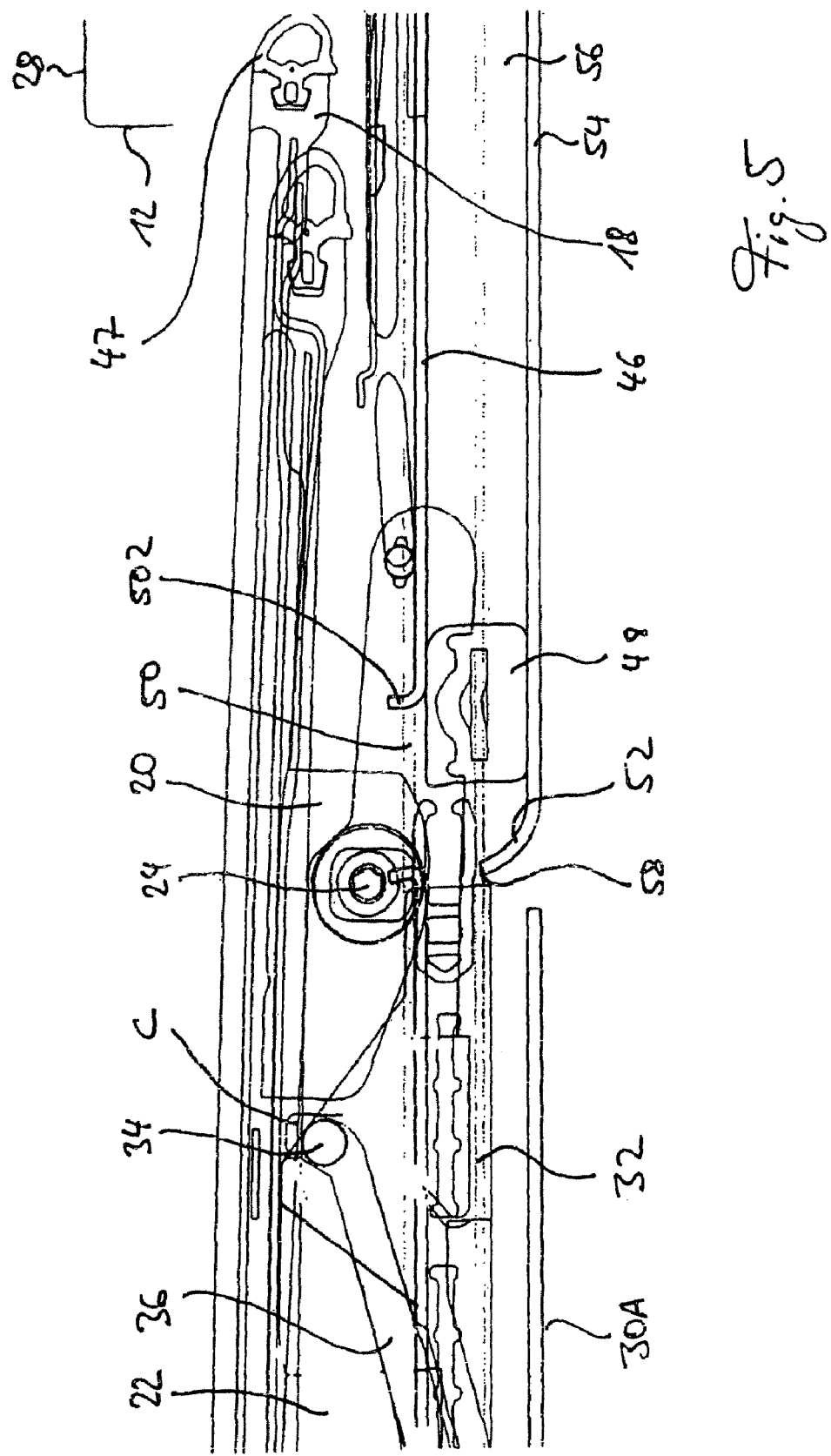
FIG. 5 shows an enlarged view of a rear section of the cover element in conjunction with a guide rail with the cover element moved slightly rearward.
Figure 6:
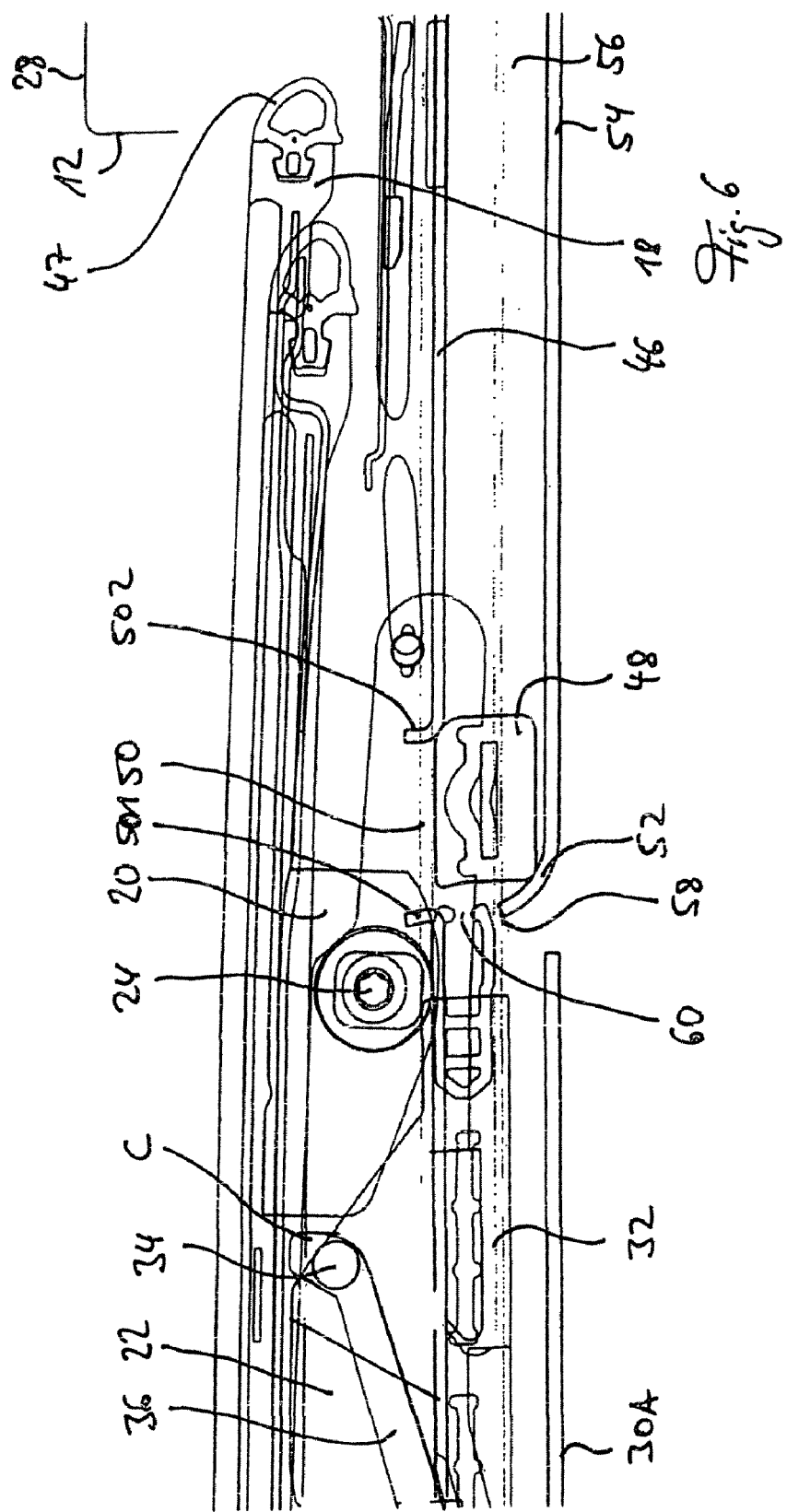
FIG. 6 shows a view corresponding to FIG. 5, but as a control slide moves onto a run-on ramp.
Figure 7:
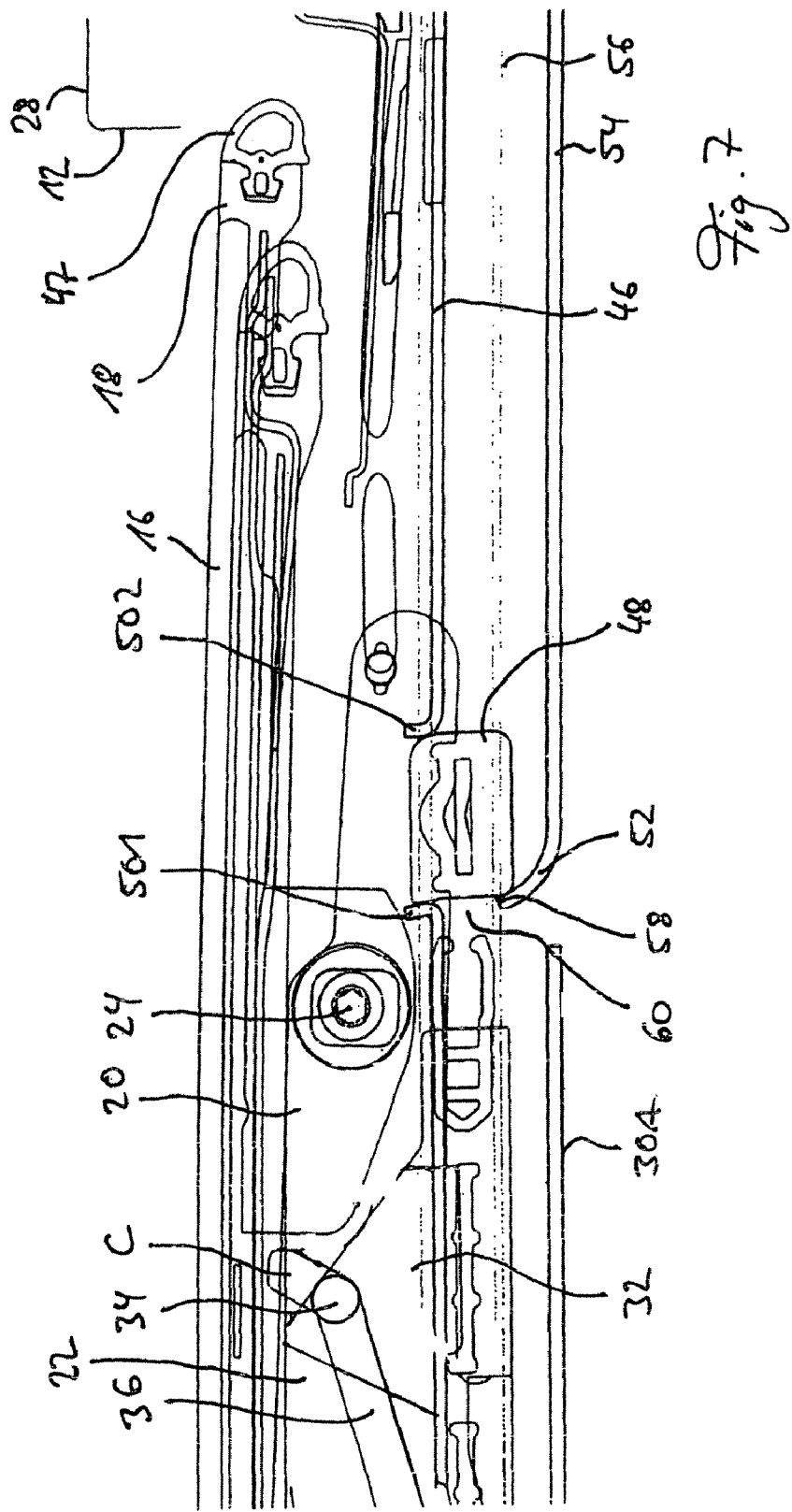
FIG. 7 likewise shows a view corresponding to FIG. 5, but as the control slide enters a locking recess.
Figure 8:
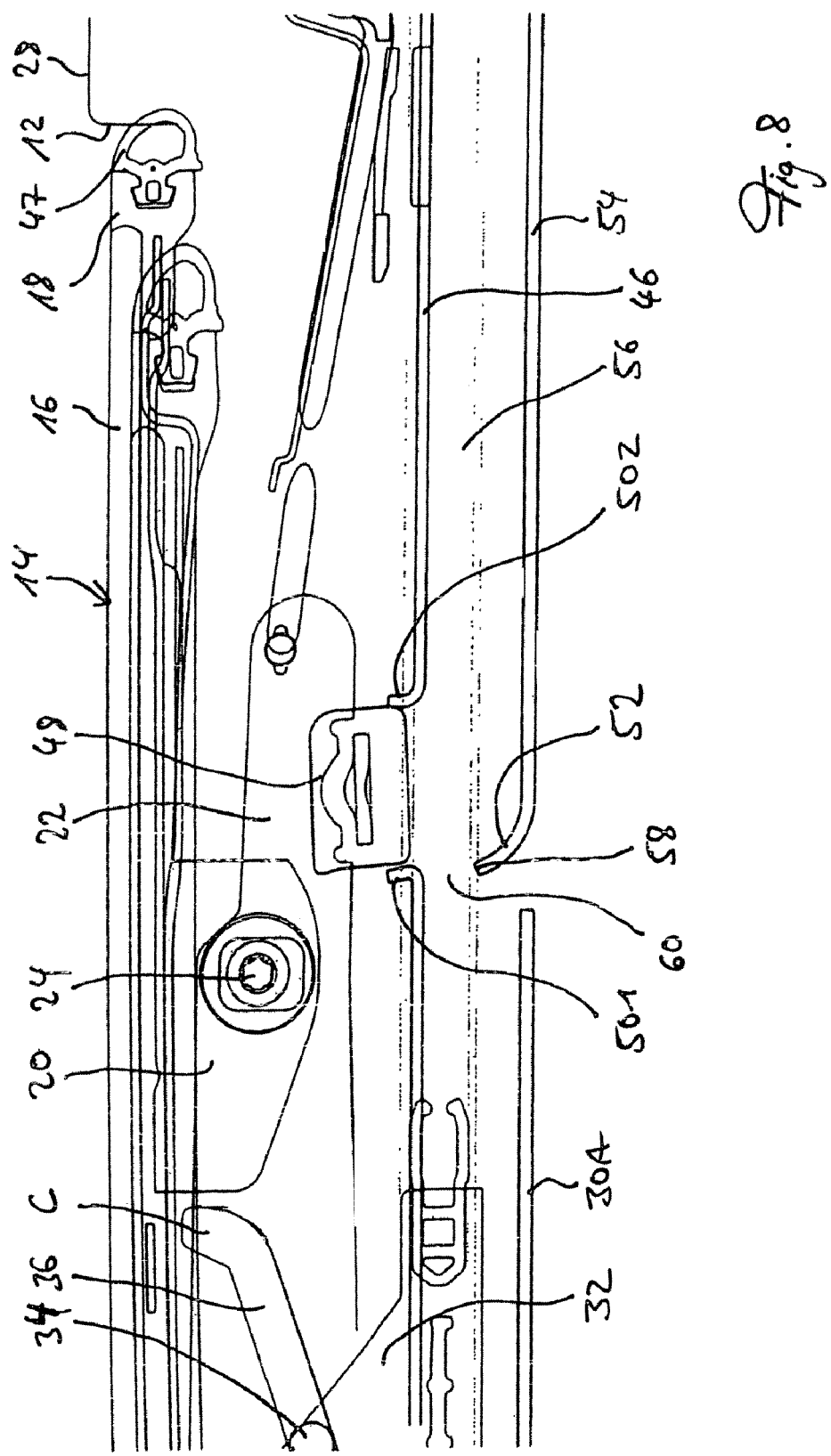
FIG. 8 likewise shows a view corresponding substantially to FIG. 5, but shortly before the closed position of the cover element is reached.
Figure 9:
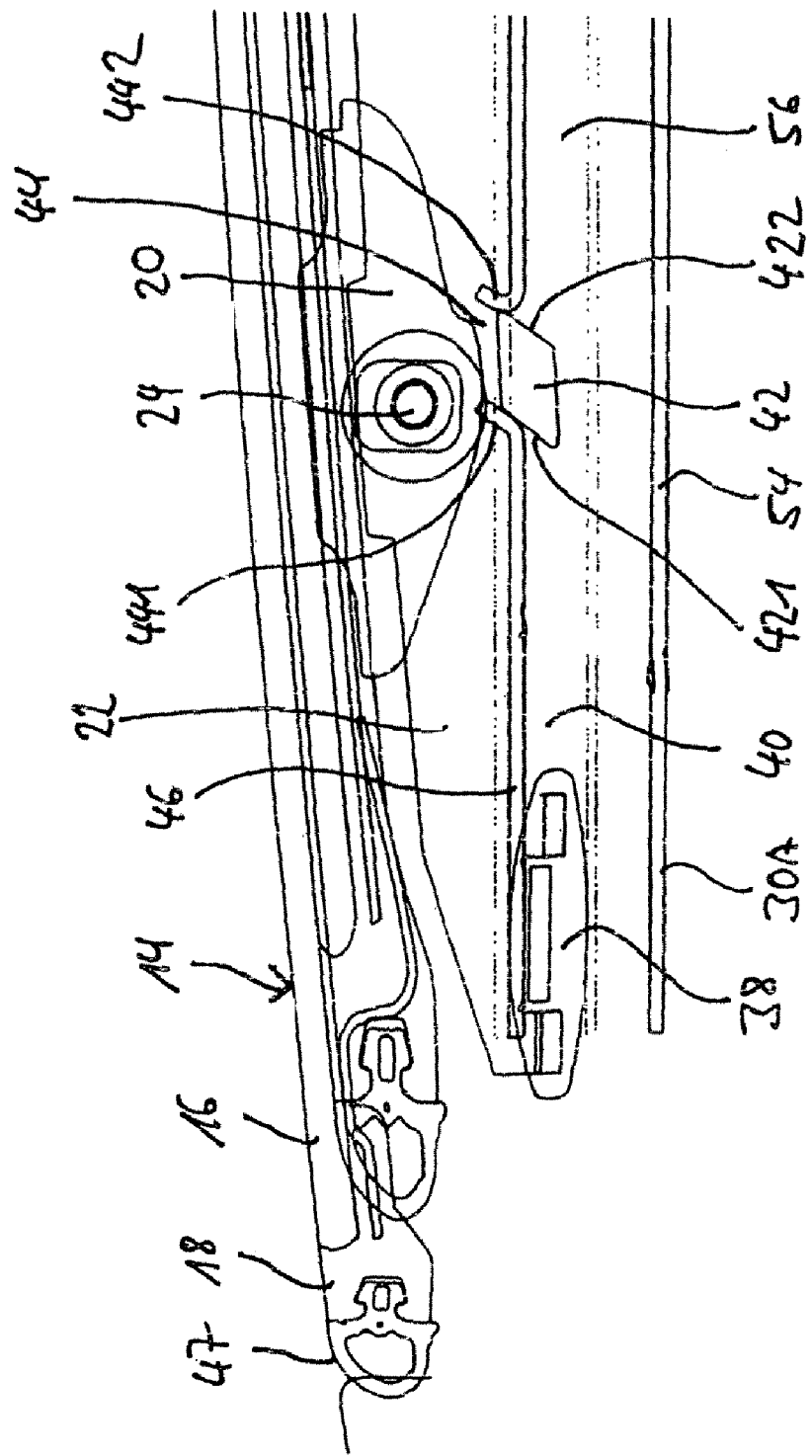
FIG. 9 shows an enlarged view of a front section of the cover element in conjunction with the guide rail in the cover element position illustrated in FIG. 8.
Figure 10:
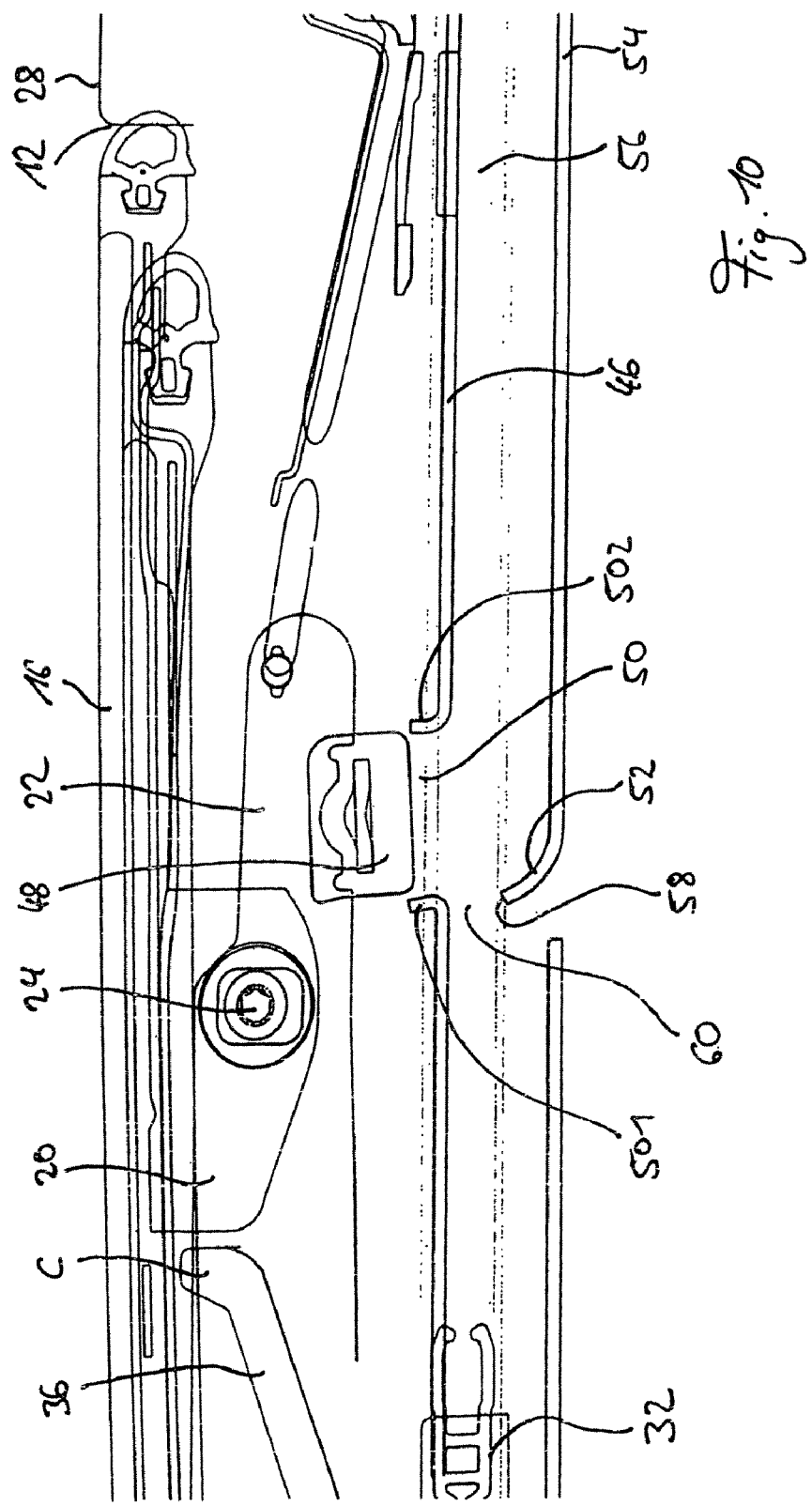
FIG. 10 likewise shows a view corresponding to FIG. 5, but after the closed position of the cover element has been reached.
Figure 11:
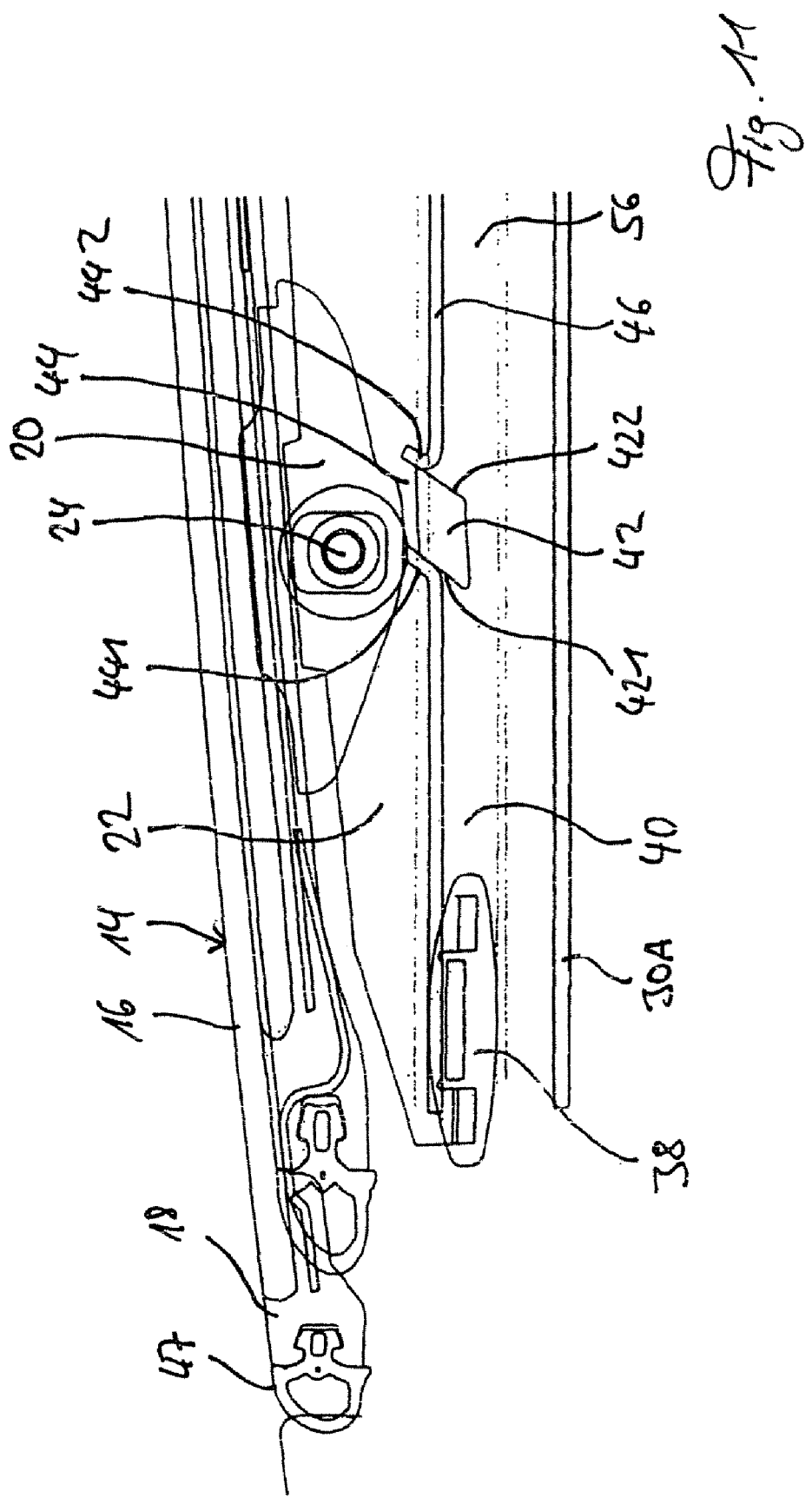
FIG. 11 shows a view corresponding to FIG. 9, but in the closed position of the cover element.
Figure 12:
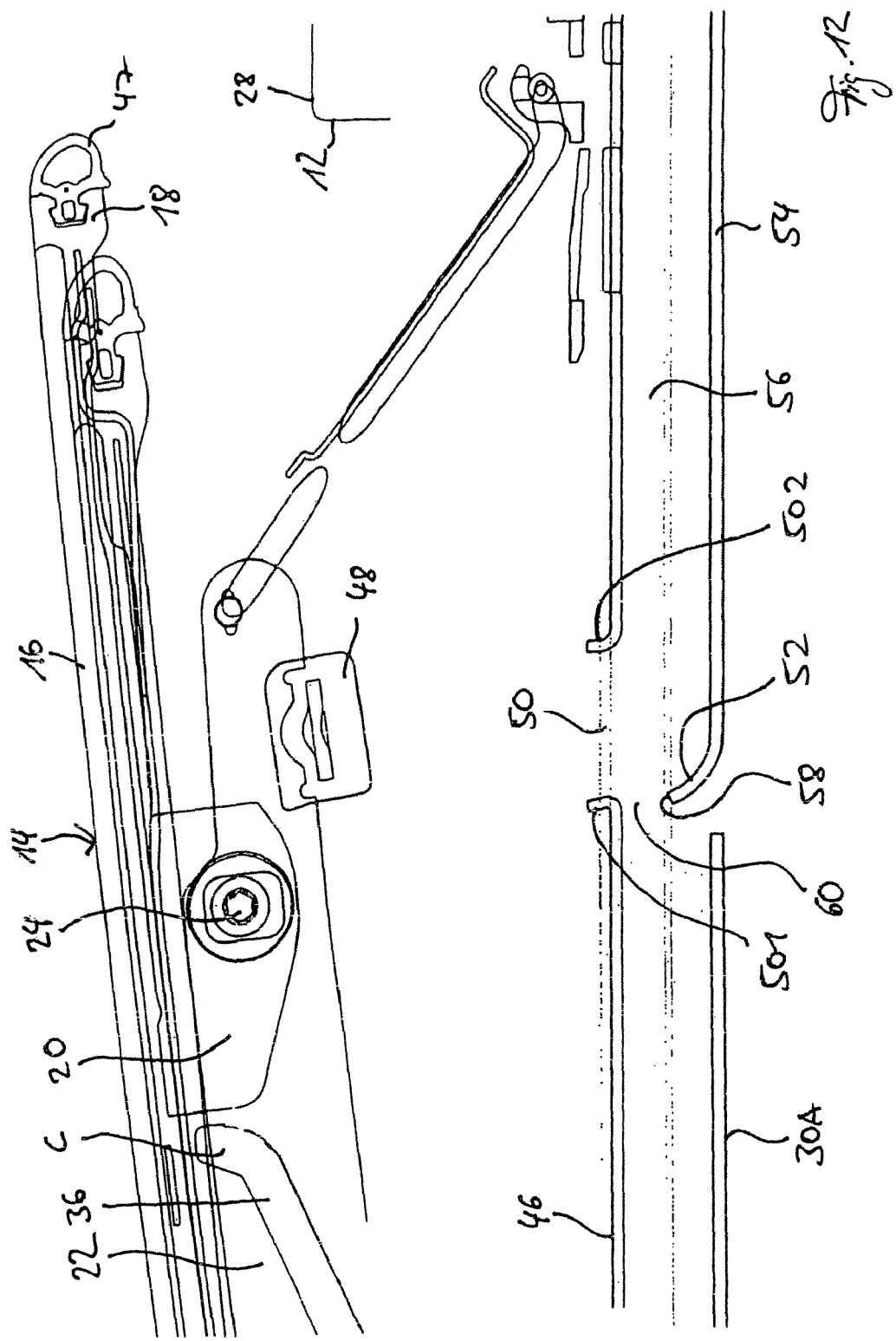
FIG. 12 shows a view likewise corresponding to FIG. 5, but in the ventilation position of the cover element.
Figure 13:
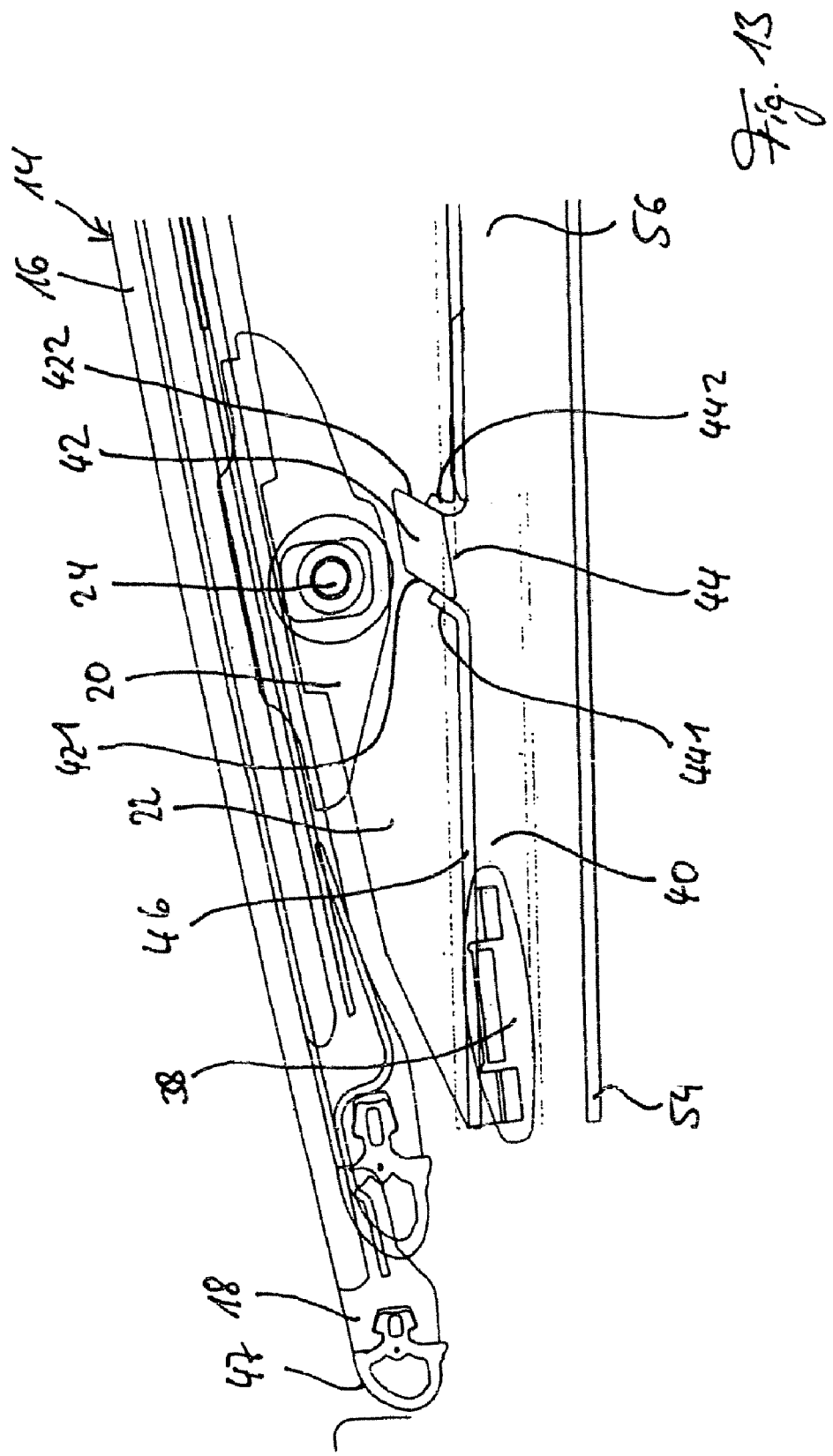
FIG. 13 shows the front section of the cover element in the ventilation position.

During closing of the roof opening 12, the cover element 14 is moved in the direction of the vehicle front until the control slide 48 moves onto the ramp 52 which is formed integrally on the lower boundary wall 54 of the guide rail 30A, which boundary wall forms the lower running surface for the control slide 48 (cf. FIGS. 5 and 6). Said ramp therefore serves as a stop which controls the pivoting movement of the cover element 14 upward into the closed position thereof and permits "gentle" entry into the pivoting movement. FIG. 7 illustrates the transfer of the control slide 48 from the ramp 52 to the locking recess 50 which is arranged in a manner favorable for tolerances. The pivoting operation itself is in turn triggered by the guide pin 34 of the driving carriage 32 moving in the slotted guide mechanism 36 in the direction of the vehicle front. In the closed position of the cover element 14, the control slide 48 is arranged above and outside the locking recess 50. When the control slide 48, upon pivoting upward, moves out of the locking recess 50 and becomes inoperative, the locking of the cover element 14 is transferred in the longitudinal direction of the vehicle to the front control slide 42 which is then arranged within the front locking recess 44 (cf. FIGS. 8 and 9). An inadvertent displacement of the cover element 14 is then prevented by the front control slide 42 which is then arranged in the locking recess 44. By means of the direct control with the ramp 52 forming the stop and with the transfer of the control slide 48, which forms a control cam, from the lower running surface or boundary wall 54 of the guide rail 30A to the upper region of the guide rail 30A by means of the inlet webs 501 and 502, the tolerances can be kept low.

LIST OF REFERENCE NUMBERS

10 Vehicle roof
12 Roof opening
14 Cover element
16 Glass body
18 Frame
20 Fastening tabs
22 Cover element carrier
24 Screw
26 Edge
28 Fixed roof section
30 A, B Guide rail
32 Driving carriage
34 Guide pin
36 Guide track
38 Slide
40 Guide channel
42 Front control slide
421 End surface
422 End surface
44 Locking recess
441 Guide wall
442 Guide wall
46 Upper wall
47 Seal
48 Rear control slide
50 Locking recess
501 Guide wall
502 Guide wall
52 Ramp
54 Boundary wall
56 Guide channel
58 Edge
60 Intermediate space

The invention claimed is:

1. A vehicle roof with at least one cover element that optionally closes or at least partially opens up a roof opening, is displaceable between a closed position and a lowered displacement position, and has a respective carrier element on two sides thereof with respect to a longitudinal center plane of the vehicle, the carrier element comprising a guide track that, for pivoting of the cover element, interacts with at least one guide element of a driving carriage that is guided in a guide rail that is fixed to the roof, wherein at least one rear control slide is arranged on the carrier element, said control slide securing the cover element during pivoting thereof against moving in a longitudinal direction of the vehicle and, during movement of the cover element, being guided in a guide channel of the respective guide rail and securing the cover element against pivoting, wherein, during pivoting of the cover element into the lowered displacement position, the rear control slide enters the relevant guide channel of the relevant guide rail via a ramp, wherein a vehicle front edge of the ramp is at least approximately aligned with a front edge of an upper locking recess of the respective guide rail, and an intermediate space that is larger than or equal to the dimensions of a front control slide in a vertical direction of the vehicle is arranged between the vehicle front edge of the ramp and an upper wall of the respective guide rail.

2. The vehicle roof as claimed in claim 1, characterized in that the ramp for the rear control slide is formed by a notch in the respective guide rail.

3. The vehicle roof as claimed in claim 1, wherein the ramp has a curved profile in a vertical direction of the vehicle.

4. The vehicle roof as claimed in claim 1, wherein the rear control slide has an overall height that is larger than the intermediate space between the upper wall of the guide rail and the vehicle front edge of the ramp.

5. The vehicle roof as claimed in claim 1, wherein a rear end region of the guide track of the carrier element has a carry-along section that has a greater slope than regions of the guide track that are arranged at the front of the end region.

* * * * *